United States Patent
Alonso et al.

(10) Patent No.: US 7,073,444 B2
(45) Date of Patent: Jul. 11, 2006

(54) METHOD FOR CHECKING THE QUALITY OF FLAT WORKPIECES AND DEVICE FOR CARRYING OUT SAID METHOD

(75) Inventors: Jeronimo Alonso, Epalinges (CH); Georg Strasser, Kradolf (CH)

(73) Assignee: Bobst SA (CH)

( * ) Notice: Subject to any disclaimer, the term of this patent is extended or adjusted under 35 U.S.C. 154(b) by 78 days.

(21) Appl. No.: 10/846,716

(22) Filed: May 14, 2004

(65) Prior Publication Data

US 2004/0251176 A1 Dec. 16, 2004

(30) Foreign Application Priority Data

May 16, 2003 (CH) .................................. 0873/03

(51) Int. Cl.
*B41F 33/00* (2006.01)
(52) U.S. Cl. ..................................... 101/484
(58) Field of Classification Search ............... None
See application file for complete search history.

(56) References Cited

U.S. PATENT DOCUMENTS

| | | | | |
|---|---|---|---|---|
| 4,210,078 A * | 7/1980 | Greiner et al. | ............. | 101/136 |
| 4,843,959 A * | 7/1989 | Rendell | ................. | 101/93.01 |
| 5,078,666 A | 1/1992 | Porret et al. | .................. | 493/1 |
| 5,235,883 A * | 8/1993 | Jeske et al. | .................. | 83/80 |
| 5,365,596 A | 11/1994 | Dante et al. | .................. | 382/8 |
| 5,664,026 A | 9/1997 | Neri et al. | .................. | 382/143 |
| 6,257,139 B1 * | 7/2001 | Schaede | .................. | 101/232 |
| 6,508,172 B1 * | 1/2003 | Kusaka | .................. | 101/483 |
| 6,595,130 B1 * | 7/2003 | Uehara | .................. | 101/216 |
| 2001/0027730 A1 * | 10/2001 | Kamoda | .................. | 101/190 |
| 2002/0094925 A1 | 7/2002 | Edens | .................. | 493/320 |

FOREIGN PATENT DOCUMENTS

DE     297 04 889 U1     8/1998

OTHER PUBLICATIONS

European Search Report dated Nov. 29, 2005.

* cited by examiner

*Primary Examiner*—Andrew H. Hirshfeld
*Assistant Examiner*—Jill E. Culler
(74) *Attorney, Agent, or Firm*—Ostrolenk, Faber, Gerb & Soffen, LLP

(57) ABSTRACT

Method and apparatus for checking the quality of blanks processed with a machine processing blanks of at least a certain type, comprising: carrying out a registering for said possible blank types, feeding a register parameter (n) defining a required number of blanks per pile, loading a pile of blanks into a device, conveying the blanks of the pile throughout a registering area ensuring the scanning of the printing and/or diecutting quality of said blanks, defining which type the registered blank is the better related, stripping the blank if it has printing and/or diecutting defects, and piling up the registered blanks that were not stripped so as to pile up a new pile until it comprises n blanks, and repeating the steps, and apparatus for the foregoing.

11 Claims, 2 Drawing Sheets

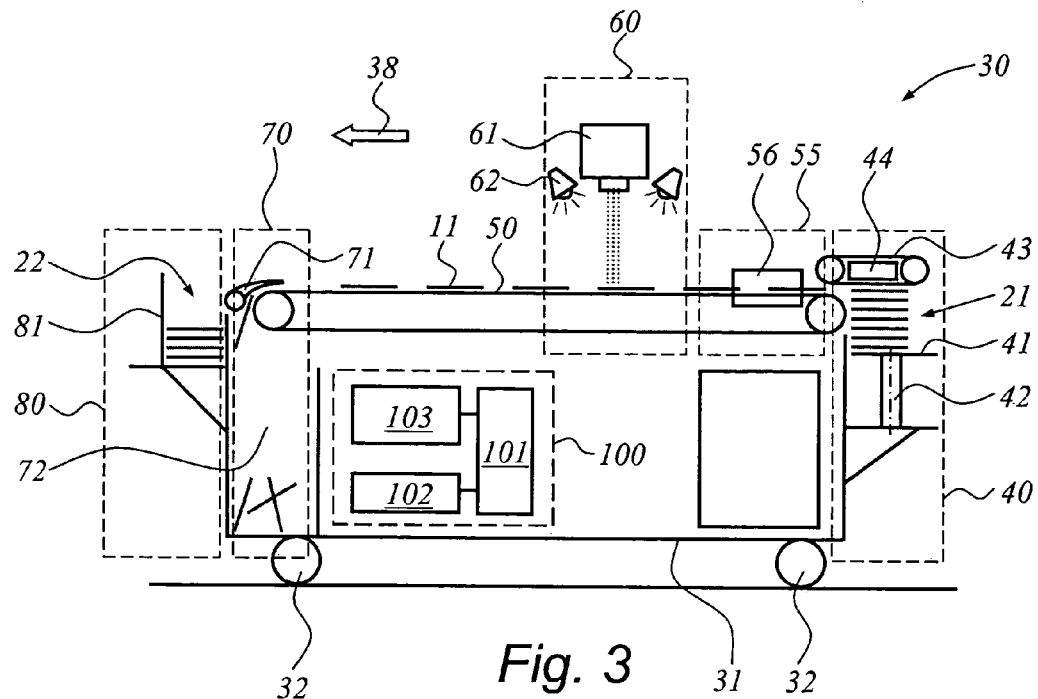
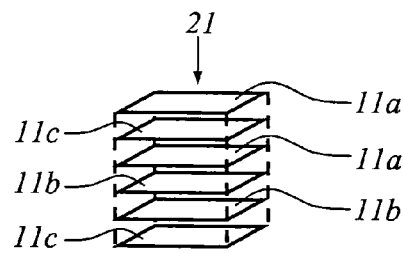
Fig. 4a
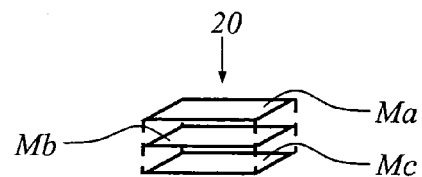
Fig. 4b
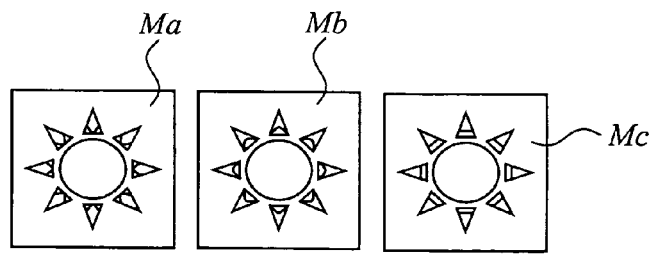
Fig. 4c

METHOD FOR CHECKING THE QUALITY OF FLAT WORKPIECES AND DEVICE FOR CARRYING OUT SAID METHOD

BACKGROUND OF THE INVENTION

The present invention relates to a method for checking the quality of flat workpieces and to a device for carrying out that method, particularly for box making machines used, for example, in the manufacture of folding boxes from a web or sheet matter, like cardboard.

Such machines comprise a plurality of stations arranged one after another enabling them to print the matter, to diecut it according to a required form by means of a plane or rotary tool, to strip the wastes resulting from diecutting, then to check the production quality before collecting the box cuttings, i.e. blanks, into a delivery station.

It is necessary to check the quality when one aims to ensure that production of workpieces will not be spotted by print defects, which are unacceptable for a high quality level. This control is usually automatically processed into the production line. Before stacking of workpieces into the delivery station, this control enables stripping of the blanks that are not in conformity with the minimal printing and/or diecutting quality requirements required for the printing.

Devices operating such controls into a machine for producing packaging are already known. One of said devices, as described in patent CH689770, comprises a camera connected to a device for image processing. The camera operates by registering and storing the position of register marks located on the front waste portion of a sheet. This front waste portion also presents a gripping surface used by a gripper bar for seizing each sheet and conveying the sheets successively from the first station to the last station, by means of an endless gripper bar chain connected to a gripper bar. The camera allows registering an image of the front waste portion where the printing and diecutting register marks are located. By comparing the camera image with a reference image, the device for image processing is then able to determine if allowances related to printing and diecutting quality are required. Although it works satisfactorily, that device is however limited to a register control of colors between themselves and to a positioning control of the print with respect to diecutting. But it does not enable registering print defects located anywhere onto the whole print surface.

Each one of the printing units of the printing station is likely to generate various defects looking like trains, ridges, spots, intensity variations or even non-printed areas, for example. Although limited to the examination of specular surfaces, the device of patent CH692847 registered such defects on the surface of a whole printed web. The defects that are registering are processed on the whole surface of a print format by a camera, and are then compared with the print of a single reference motif, which previously had been recorded. The web print format usually comprises a plurality of blanks evenly distributed with one another in order to reduce the inserted waste as much as possible. The outline of each blank corresponds to a flat box, in a developed shape. The maximal print format is defined by the geometrical dimensions of the printing units cylinders, i.e. by the width and the circumference of the printing cylinders, or by the width of the print substrate, i.e. the sheets or the processed web width.

When a print defect is registered by the camera, an operation has to check the portion of the web spotted with the defect to strip it downstream, usually after it is diecut into separate blanks. It is indeed easier to strip small surfaces which have already been split rather than trying to eliminate a whole sheet or web portion equivalent to the whole format surface. The size of that format is often important and can typically be of about ½ $m^2$ to 1 $m^2$ for example. The diecutting operation is processed either rotatively, by conveying the print substrate between a diecutting cylinder and an anvil cylinder, or flatbed into a platen press equipped with a plane diecutting tool that is vertically and cyclically moved. Such diecutting tools are described with their details respectively in patent application EP1060850 and in patent CH689975.

The stripping of waste portions is usually related to the print quality control within a production line, from which the stripping results thus more usually directly.

At present, one technique is to strip a whole line of diecutting blanks, by means of a swinging flap located across the whole width of the machine. This method is described in patent CH633761. It has a drawback of producing an important useless waste, since the blanks even without any print defect, but located next to the defect blank of the same line, are also stripped.

U.S. Pat. No. 5,235,883 discloses a stripping system including two flaps arranged side by side and occupying the whole width of the diecutting web. It is possible to independently drive one or the other flap so as to strip only the blank having a print defect. This system can satisfactorily work for blanks ranging from medium to large sizes. But, it is not effective when it is used for small sizes blanks, like cigarette packaging, for example. If the web width can indeed comprise up to ten blanks, it would be necessary to provide as many independently movable flaps. One understands that such a device would quickly become too delicate, complicated and even expensive for production. Moreover, since the width and number of the flaps are necessarily related to the width and the number of blanks per line, that device would not be convenient for job changes, e.g., changing from a ten blanks printing to another printing of only six blanks per line.

Another drawback of devices with several stripping flaps arranged side by side is that they provide blanks piles of different heights into the delivery station. If one line of the print format comprises several spotted blanks, those blanks will be automatically stripped, whereas the blanks in the bordering lines will successfully reach the quality control and would thus all be collected. A variable and hazardous blanks number per pile will thus be reached and this fact is unacceptable for manufacturers and customers using said machines.

Another drawback of machines that strip the waste directly inside their production line results from their fast production speed. If those machines can effectively work at high rates, they make the stripping devices appreciably more complicated, as those devices are to be limited to very short reaction times and make the follow-up, by sensors of a blank intended to be stripped. Moreover, the high speed stripping also increases the stuffing risks that should then cause stoppage of the whole producing machine and tend to cause important additional web waste at the time of each re-start. At such speeds, it becomes very difficult to strip, at the right time, the right blank that has been registered upstream by the quality control device as not being conforming.

To obviate this drawback, stripping the two blanks next to the defective one has been considered, to make sure that the defective blank will be certainly stripped. However, this process uselessly increases the waste and increases the drawback related to the variable blanks number per pile at the time of the delivery.

To obviate the inconvenience caused by high speed stripping, one solution was to simply not strip the defective blanks and to manually carry out that operation after delivery of the piles of blanks. Since the quality control system is able to check in which pile of blanks in which a defective blank was registered, this blanks sorting became quickly too long, demanding and quite not very obvious for small and less visible defects. Moreover, the risk of not finding the defective blanks anymore was the more persistent and also did not then ensure a hundred percent defectless quality. Lastly, because of high production rates, ranging from 8,000 to 12,000 boxes per minute, several operators had to be necessarily simultaneously assigned to the manual production sorting of one machine.

If all blanks of a sheet or a printed format are usually the same, it can also happen that they are sometimes slightly different from one another, due to three or four different kind of printings being simultaneously processed with the same printing format. Thus more particularly occurs with cigarettes packaging where a mixture of unlike boxes models are typically found in a carton sold on the market. These boxes can be differentiated due to small distinct indications. Some blanks or boxes mention, for example, "highly injurious to health", or "smoking causes cancer" or even "smoking is injurious to children of pregnant women". This mixing of box models in a same cigarette carton is one producers' requirement. That is the reason why the blanks of a same sheet or a same printing format which is intended for processing cigarette packaging will not all be the same but will usually comprise a mixing of some blanks that are slightly different from one another. In such a case, the plurality of models will thus cause new inconvenience while automatically registering print defects, mainly during comparison between not only one main reference model, but between a range of several suitable models slightly different from one another.

SUMMARY OF THE INVENTION

The aim of the present invention is to obviate the above drawbacks and to overcome, at least partly, the inconvenience of the abovementioned solution, while providing a method for checking the quality of flat workpieces and to provide a device for automatically carrying out said method.

The invention enables production quality to be ensured at a hundred percent, thus avoiding the return of defect series.

The waste can be reduced to a minimal value, and the needed work force can be of only one person for manual sorting, despite high production rates. Stuffings like the ones due to bad stripping, as well as the resulting machines stoppages, can now be fully avoided. The solution of the present invention also has economic advantages. Moreover, obtaining whole blanks piles, without any inconvenience during production, is also guaranteed. Lastly, the device of the invention is also solid and is movable.

BRIEF DESCRIPTION OF THE DRAWINGS

Other features and advantages of the present invention will be more readily understood from the following description of an embodiment which is provided in a non-limitative example and illustrated in the accompanying schematic drawings, wherein:

FIG. 3 shows an elevation view of the device for checking the quality of flat workpieces in the present invention, FIGS. 4a, 4b et 4c show respectively the detail of a usual blanks pile, the one of a reference pile comprising three blanks as well as the schematic description of said three blanks taken as reference models.

DESCRIPTION OF PREFERRED EMBODIMENTS

Figure 1:
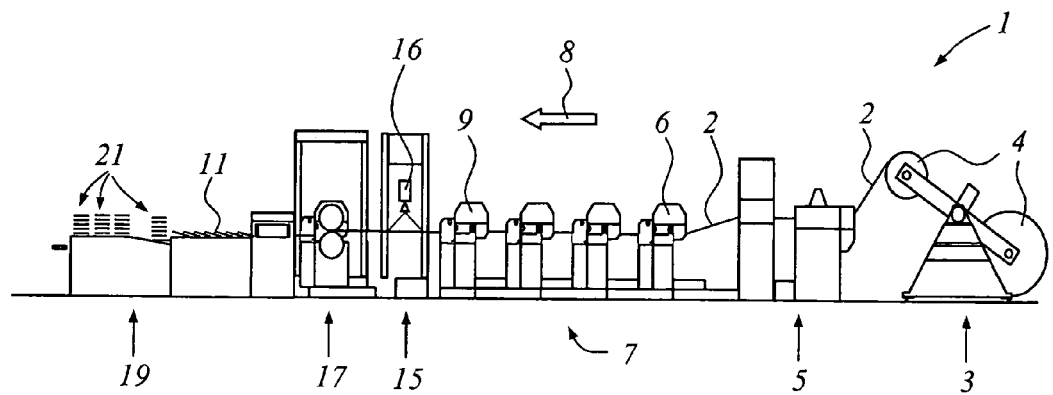
FIG. 1 shows an elevation view of an example of a production line as known from the present state of the art.

FIG. 1 shows a schematic view of a machine 1 producing packaging intended for the manufacture of folding boxes starting from a web material 2. This machine or production line comprises firstly a web unwinder 3 that supports rollers 4 made of cardboard, for example. An infeed station 5 enables the web 2 to be conveyed toward the first printing unit 6 of the printing station 7 in the traveling direction of the web, illustrated by arrow 8. The four successive printing units shown in FIG. 1 enable achieving a standard four-color printing.

Figure 2:
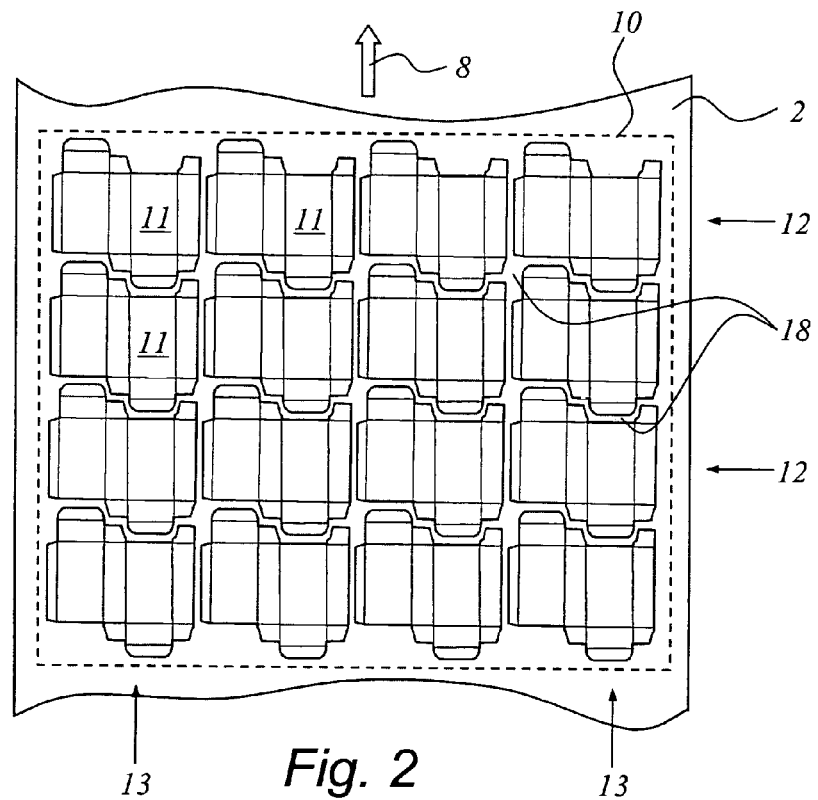
FIG. 2 shows a plan view of a printed web portion.

As better shown in FIG. 2, the web 2 is printed with a printing format 10 during each entire travel of the printing cylinders of the different printing units. The format 10 is shown in this Figure with broken lines. Blanks 11 of a same format 10 are arranged in lines 12, or rows 13 along the traveling direction of the web 2 as shown by arrow 8. Each blank 11 is shown as a box in a developed form, having future folding sections which are also shown. For the clarity of the Figure, the printing patterns of these boxes are not shown here. Accordingly, note that the terms of blanks, box cuttings or more commonly flat workpieces are interchangeably used with reference to the same workpieces 11. However, for practical reasons due to the length of these terms, the term blanks instead of said other two will be used in the following description.

Returning to FIG. 1, note that, at the end of the last printing unit 9, the web 2 reaches a quality control station 15 aiming to check if printing was not spotted with defects like burrs, printing holes, stray lines, etc. . . .

That checking, especially if it is processed by a camera 16 registering the whole surface of a printing format 10 determines, by comparison to a stored format taken as an example, if the portion of the registered web is spotted with a defect. If that is the case, the control device of this station 15 is able to define into which line 12 and which row 13 of the format 10 the defect was registered.

After the quality checking, the web is conveyed into a diecutting station 17. The station will sort all the blanks 11 from the rest of the web 2 while usually producing inserted waste 18 that is immediately collected. Blanks 11 then move in a shingling manner into a delivery station 19 before being piled up in rows and forming piles 21 that can be palletized for storage or for being conveyed outside the production line 1.

The production line shown in FIG. 1 uses a web material and a rotary diecutting station. However, note that it may use a production line using sheets of a large format as the print substrate, instead of using a web material, and may use a platen for flatbed diecutting, instead of using a rotary diecutting device. There are many other alternatives for illustrating such a production line, like the removal of the quality control station 15, for example.

FIG. 3 is an elevation view of the quality control device of the invention. This device 30 is an independent unit of the machine or production line 1 and is intended for registering the printing and/or diecutting quality of the blanks 11 issued from the delivery station 19. According to the traveling direction of the blanks shown by arrow 38, the device 30 comprises, upstream to downstream, an infeed station 40 of blanks 11, a conveyor 50 for conveying blanks throughout a registering area 60, a stripping station 70 and then a delivery station 80 for registered blanks according to the minimal quality requirements.

Device 30 comprises a frame 31 mounted on wheels 32 making it easily movable. The infeed unit 40 especially comprises a table 41 on which at least one pile 21 of blanks 11 can be loaded. That table is vertically moved by a piston 42 that enables positioning the top of the pile 21 at a constant level to ensure a correct infeed of blanks 11 onto the conveyor 50.

The vertical movement of the table can be either mechanically controlled, using a compression spring for example, pneumatically or hydraulically controlled when using a piston, or may even be electrically controlled by an engine, for example. The infeed device can effectively comprise various electronic devices and/or optical, even electrical ones, for ensuring motion control of the table 41. As seen in FIG. 3, the infeed unit is equipped with an infeed device 43 arranged above the pile 21 so that the blank located at the top of the pile can be conveyed in the direction of arrow 38 through the infeed device 43 when it is set in motion. The device 43 can be represented by an apron, belts, rollers or by a device with suction cups, for example. It is moreover possible, if necessary, to add a suction chamber 44 to ensure friction between the upper side of the blank and the lower side of the infeed device 43. Alternatively, an infeed device 40 may comprise a device for feeding blanks through the bottom of the latter instead of their top. However, the infeed embodiment shown in FIG. 3 avoids the variable pressure exerted by the permanently reduced weight of the pile and ensures a constant optimal pressure of each blank against the infeed device 43.

The blanks 11 are then successively fed by the conveyor 50 into the registering area 60 where it is intended to check their printing and/or diecutting quality. If necessary, the upper part of the conveyor 50 may comprise an alignment area 55 into which each blank is aligned, through an aligning device 56, parallel to one of the longitudinal ends of the conveyor so that the blank is always horizontally positioned with a permanent angle. Hence, the possible slippage and rotation of the blanks at their infeed time can be corrected and controlled. To avoid any other blanks slipping during their conveyance onto the conveyor 50, the conveyor can also comprise a suction mechanism like the one for the abovementioned suction chamber 44. In such a case, the conveyor 50 can be advantageously represented by one or several bored aprons, belts, or even driven rollers.

The device at the registering area 60 comprises at least a camera 61 mounted above the conveyor 50 and oriented downwardly so as to face the printed surface of the blanks. A lighting device 62 ensures sufficient light in the registered area. This light can be the one of flash-lights or a permanent light, for example. If necessary, a light of a certain wave length may be used in order to better increase the light contrast of the printed patterns.

If a blank 11 was registered as not coming within the quality requirements by means of the device of the registering area 60, it is stripped during its passage through the stripping device 70. This device can comprise at least one deviation device 71 that, when actuated, forces downward deviation of the defective blank 11, which then falls down then into a collecting tank 72.

After successfully passing the quality control, the blanks 11 that are not stripped from the conveyor 50 by the deviation device 71 follow the path toward arrow 38 and are finally collected in the delivery station 80. That station can simply comprise a receptacle 81 in which all corresponding blanks are delivered in at least one new pile 22. In order not to impede the blanks delivery, the receptacle 81 could advantageously be vertically moved downwardly so that the level of the top of the new pile 22 remains the same. The mechanism enabling this vertical movement can be identical to the displacement of the table 41 and it can also, if necessary, depend on signals possibly emitted electromechanically or by photocell sensors. To improve the piling up of new piles 22, the delivery device may be equipped with a jogger (not shown) that is actuated by swivelling units enabling the alignment of the sides of the new piles 22 or the vibration of the piles in order to pile up evenly aligned blanks.

One aim of the invention is to ensure formation of entire piles, i.e. piling up new piles 22 with a permanent blanks number required according to a user requirement. This number value can be stored as a register parameter n previously infed during the first processing stages of the present invention. That value would meet the number of blanks which all new piles 22 should comprise according to customer or manufacturer requirements. Thus, from a pile 21 arranged in the infeed device 40, the device 30 is able to pile up several new piles 22 comprising each n blanks 11 coming within quality requirements. If during the process, the number of remaining blanks in pile 21 is below the n value, which the device 30 is intended to receive, into the infeed unit 40, additional blanks 11 or a new pile 21 are added enabling ending the new pile 22 of the delivery unit when its blanks number reaches the register parameter n value.

The various units and members of device 30 can advantageously be driven and controlled by a central unit 100 comprising a computer 101 to which a control interface 102, like a keyboard or a touch screen keyboard, and an output peripheral 103 like a screen or a printer, for example, can be connected. The central unit 100 has a specific software and drives, for example, the raising of table 42, the processing speed of the infeed device 43 and of the conveyor 50, the aligning device 56, the camera 61 and the lighting lamps 62, the stripping device 71 and the receptacle lowering. The central device 100 advantageously also enables the control over various severe situations by means of register sensors. It is thus possible to register the passage end of pile 21, alignment defects of blanks 11 within the alignment area 55, a light defect or a malfunctioning of the stripping device 71.

The central device 100 also primarily enables control over operations processed into the registering area 60. It enables registering all kind of possible defects and defining their suitable quality limits. Acting in that way, the camera 61 enables, through the analysis of each image pixel of the blank, registering outlines of the blank, the lines of color changes, the flatbed areas, all color intensities, etc. A previously recorded reference model in the central device 100 and various parameters allow the limits to make it possible to register with comparison each printing and diecutting defect of each blank.

FIGS. 4a, 4b et 4c refer to the drawback of different types of blanks 11a, 11b, 11c, about three blanks by the non-limitative example, intended to be in a same pile 21 (FIG. 4a). Note that this drawback refers to blanks having a few small differences between one another, like distinct writings printed onto cigarettes packaging of the same cartridge. In order to simplify these differences, FIG. 4c shows three kinds of reference blanks Ma, Mb, Mc with a pattern showing a sun each time appearing slightly different. In order that the device 30 might register these reference blanks and not assign any one of the differences to a print defect, it is advisable to have the device ready for registering all of the various blanks types to be found into a pile 21.

To do this, an operation infeeds a reference pile 20 into table 41 (FIG. 4b) made of reference blanks Ma, Mb, Mc, . . . Mz, of faultless quality. The operator checks that this reference pile 20 is comprised of at least all different blanks types, according to the example of the three blanks types 11a, 11b, 11c shown by the reference blanks Ma, Mb, Mc.

During registering of the various possible types, the device 30 is going to register all blanks in the reference pile 20 and store their images. By means of the camera 61 and of appropriate software, the central device 100 is able to automatically register and count the various blanks types by comparing small differences with the previously recorded reference blanks. If several reference blanks of a same type are registered during the registering process, their images can advantageously be brought about before being stored. Thus, several blanks passages of the same reference pile 20 could also be processed so as to bring about the registered images during each passage. At the end of the registering process, the central device 100 will have stored as many reference images as there are blanks of different types. As shown in FIGS. 4a, 4b, 4c, the central device will thus have stored three reference images related to images of the reference blanks Ma, Mb and Mc. The device advantageously does not constrain manual infeed one by one of the reference blanks for storing their image. Moreover, since counting of the different possible blanks types is also automatically carried out, the process makes initializing operation of device 30 easier.

The successive and preferred stages of the process enable advantageous use of the device for blanks 11 processed through a printing and/or diecutting machine 1, which may or may not comprise a quality checking station 15, the stages comprising the following:

1. registering all different types 11a, 11b, 11c, . . . 11z of flat workpieces arranged into piles 21,
2. infeeding the value of a register parameter n related to the required number of flat workpieces 11 to be in new piles 22,
3. loading at least one pile 21 into the infeed station,
4. conveying at least one flat workpiece 11 from at least one pile 21 throughout a registering area 60 ensuring the scanning of the printing and/or diecutting quality of the registered flat workpiece 11,
5. defining which one of types 11a, 11b, 11c, . . . 11z, the registered flat workpiece 11 is the better related to,
6. scanning possible printing and/or diecutting defects in the registered flat workpiece 11,
7. stripping the flat workpiece if it has printing and/or diecutting defects,
8. piling up flat workpieces into a delivery station 80 in order to pile up a new pile 22 of not stripped workpieces,
9. when all flat workpieces 11 of pile 21 have been registered, waiting for the loading of at least one new pile 21,
10. repeating the process from the 4th stage until the number of flat workpieces 11 in the new pile 22 is identical to the value of the register parameter n,
11. unloading the new pile 22 from the delivery station 80,
12. repeating the process from the 4th stage until all piles 21 of a same series were registered.

Although it was previously intended to be an independent standard of the production line 1, the device 30 of the present invention for checking the quality could be related to the production line through an automated conveyor that could convey the products, or piles 21, issued from the delivery station of the production line 1 and automatically feed them into the infeed station of the device 30. Automatic loading of the piles 21, as described above, would thus become interdependent with the production line 1, in particular its production rate.

In a same way, automating the manufacturing operations processed into the delivery station 80 could be intended for removing the new piles 22 onto a palette, an apron or an evacuation carriage so as to free the full space into the receptacle 81. Moreover, the number of piles that are at the infeed station 40 and are at the delivery station 80 only depends on a plurality of alternatives that may be possibly added to the device of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for checking the quality of workpieces processed by a printing or a diecutting machine which produces workpieces of at least one type, the method comprising:
    registering each of the types of workpieces in a pile of the workpieces;
    infeeding a register parameter corresponding to a selected number of workpieces in the pile;
    loading at least one pile of the workpieces in an infeed station for checking the quality of the workpieces;
    conveying at least one workpiece of the one pile at the infeed station through a registering area and scanning the printing or diecutting quality of the registered workpiece, at the registering area, defining which of the different types of the workpieces to which the workpiece being scanned is most closely related;
    scanning the workpiece for possible printing or diecutting defects in the registered workpiece;
    stripping any registered workpiece which has printing or diecutting defects that are scanned so that they are not piled in a delivery station;
    piling the workpieces that have not been stripped into a new pile in a delivery station.

2. The method of claim 1, further comprising when all of the workpieces in the pile have been registered, loading at least one second pile of workpieces to be registered and continuing the process hereof on the new pile of workpieces until the number of workpieces in the new pile is the same as the registered parameter value of the number of workpieces in the pile;
    unloading the second pile in the delivery station and continuing with loading subsequent piles in the same process.

3. The method of claim 1, wherein the registering of different types of workpieces is performed using a reference pile having as many reference workpieces therein of acceptable quality as there are different types of workpieces.

4. The method of claim 3, wherein the step of registering all of the different types of workpieces comprises loading of the reference pile of workpieces into an infeed station,
    conveying the first reference workpiece through the registering area;

storing the image of the reference workpiece, piling the reference workpieces in the delivery station; and repeating the foregoing process through each of the reference workpieces in the reference pile.

5. The method of claim 4, further comprising:

bringing up the images of the same type of reference workpieces in order to bring up only one reference workpiece per type of the workpieces.

6. The method of claim 1, further comprising automatically loading the piles in an infeed station, and automatically unloading the piles from the delivery station.

7. The method of claim 6, wherein the printing and diecutting machine operates at a particular rate with reference to the workpieces and the automatic loading of piles is coordinated with the printing and diecutting machine operation.

8. The method of claim 1, wherein the workpieces are flat workpieces and the quality of the flat workpieces is being checked.

9. Apparatus for checking the quality of workpieces comprising:

a printing or diecutting machine for workpieces including at least one type of workpiece;

an infeed station for feeding the workpieces to the printing or diecutting machine;

a registering area for registering the different types of workpieces in the pile of workpieces in the infeed station;

apparatus for scanning the workpieces and for registering a parameter related to a required number of workpieces per pile;

after the infeed station, a registering area for scanning the printing and diecutting quality of the registered workpieces in the registering area and for defining which one of the types of workpieces that the registered workpieces is most related to;

a scanner for scanning possible printing and diecutting defects in the registered workpiece;

a stripper for stripping those registered workpieces which have printing or diecutting defects detected and stripping them away from the path of the workpieces, a delivery station for receiving a pile of the workpieces that have not been stripped;

and a conveyor for conveying the workpieces from the infeed station past the infeed area, past the scanning device, past the registering area, past the station at which detected defective workpieces are stripped, and to the delivery stations.

10. The apparatus of claim 9, wherein upstream of the scanning device and the registering device the conveyor includes an alignment area including an aligning device for aligning the workpieces.

11. The apparatus of claim 9, further comprising a central control device for controlling the operations of the other elements of the apparatus.

* * * * *